United States Patent [19]
Jureit

[11] 3,822,475
[45] July 9, 1974

[54] MEASURING AND MARKING APPARATUS FOR WOODEN STRUCTURAL ELEMENTS

[75] Inventor: John Calvin Jureit, Coral Gables, Fla.

[73] Assignee: Automated Building Components, Inc., Miami, Fla.

[22] Filed: Aug. 14, 1972

[21] Appl. No.: 280,257

[52] U.S. Cl. .............................................. 33/76 R
[51] Int. Cl. ............................................ B43l 13/04
[58] Field of Search .................................. 33/76, 32

[56] References Cited
UNITED STATES PATENTS

| | | | |
|---|---|---|---|
| 571,252 | 11/1896 | Wackinshaw et al. | 33/76 R |
| 935,014 | 9/1909 | Green et al. | 33/76 R |
| 1,600,545 | 9/1926 | Hooper | 33/76 R |
| 2,549,634 | 4/1951 | Parsons | 33/76 R |
| 3,216,114 | 11/1965 | Bidwell et al. | 33/80 |
| 3,373,495 | 3/1968 | Grange | 33/76 R |

*Primary Examiner*—Harry N. Haroian
*Attorney, Agent, or Firm*—Le Blanc & Shur

[57] ABSTRACT

The apparatus includes a table and a fence along one side of the table against which a wooden frame plate is butted. Coextensively with the table there is carried an elongated support and guide rod on which is mounted a slide carriage. Fixed and slideable rules are mounted on one side of the table. The carriage includes a pointer which registers along the various indicia on the rules. A blade is hingedly carried by the carriage and is lowered on top of the plate on the table whereby the plate is marked when the pointer is aligned with selected indicia on one of the rules. The carriage also mount a stand for holding instruction sheets whereby a workman can move the carriage along the slide rod in accordance with information contained on the instruction sheet to locate the blade at selected positions along the plate.

3 Claims, 5 Drawing Figures

MEASURING AND MARKING APPARATUS FOR WOODEN STRUCTURAL ELEMENTS

The present invention relates to a measuring and marking apparatus for wooden structural elements and particularly relates to a table for measuring and manually marking plates utilized in wooden structural frames, for example, wall frames and the like, in accordance with such measurements to indicate the location of the various parts of the frames intermediate the plates, i.e., the studs, jacks, etc.

Current building construction methods oftentimes utilize prefabricated wooden building frames which are transported from a fabrication plant to a construction site for ultimate assembly into the building construction. At the fabrication plant, the wooden elements forming the parts of the frames are cut to size and assembled to form the building frame at a prefabrication plant. Substantially automated systems for cutting the wooden structural elements to size, marking the top and bottom plates of frames to indicate the location of the intermediate frame parts therealong and automatically nailing the studs and other intermediate parts to the plates have been proposed and constructed. One such system is disclosed in copending U.S. application Ser. No. 25,536 filed Apr. 3, 1970. In that system, the wooden elements are disposed on a cutting and marking table and first cut to length and then automatically marked at measured locations therealong to indicate the various locations of the intermediate frame parts. These cutting and marking operations are performed in response to a computerized control system with the cutting, measuring and marking instructions provided either on punched cards or tape. While this system is eminently satisfactory, it has one disadvantage in that the principal piece of equipment is expensive. Moreover, while such system is particularly practical and economical for use in the prefabrication of a large number of structural frames wherein the full capacity of the machine is utilized, it has been found, however, that such equipment cannot be justified for a manufacturer of a small number of frames and, indeed, its purchase and/or use cannot be economically justified by the smaller fabricators. There is thus an established need for a simple, economical method of marking the structural wooden plates particularly for use in a small production runs of frames and particularly for use by other than large volume fabrications. Resort to manual marking of the plates with the assistance of a simple, accurate, time saving measuring and marking apparatus is thus indicated.

Manual measurement and marking of plates in accordance with such measurement to indicate the location of the intermediate frame parts has been proposed and accomplished in the past. One of the simplest apparatus utilized for this purpose comprises a template for overlying the plate, the template having legs extending therefrom indicating the location of the intermediate frame parts, for example, studs on 16 inch centers. A template of this type is disclosed in U.S. Pat. No. 3,169,320. See also U.S. Pat. No. 2,187,087 for a similar template. While these templates are satisfactory as disclosed in these patents, they are unwieldy to use and very often result in erroneous measurements and markings of the plate. Moreover, such templates are usually very short in length whereby they must be moved along the plate to be marked, hence consuming considerable time, labor and effort as well as increasing the possibility of errors in measurement and marking. Another manually operated marker for marking studs is disclosed in U.S. Pat. No. 2,708,315. In that patent, a carriage is slidably mounted on a support for registry with selected indicia therealong. Upon a registry, arms carried by the carriage are swung into engagement with the stud and mark the stud at a selected location. This, however, is not a particularly convenient measuring device and the marker is prone to errors in measurement due to manipulation of the arms after the measurement is made.

The present invention provides a measuring and marking apparatus which minimizes or eliminates the foregoing noted and other disadvantages associated with prior measuring and marking apparatus and provides a novel and improved measuring and marking apparatus for wooden structural elements having various advantages in construction, mode of operation and result in comparison with such prior manually operated measuring and marking apparatus. Particularly, the present invention provides a measuring and marking table comprised of an elongated platform or table having a fence coextensively along one side thereof against which a wooden framing element is clamped. Beyond the fence and coextensive with the table is mounted an elongated guide or slide rod which mounts a carriage. The carriage mounts an articulated blade which overlies the fence, table and the plate on the table and which provides a guide for marking the plate. The carriage also mounts a stand for carrying appropriate instruction sheets containing measuring and marking information. Beyond the fence, there is provided a fixed rule coextensive with the table. The carriage carries a pointer for registration with the various indicia on the rule whereby the blade can be located at measured positions along the plate from a reference position, i.e., the end of the plate butted against an end stop on the table.

A slideable rule is also carried along the table back and has indicia spaced therealong corresponding to the conventional spacing of the intermediate frame parts of the structural frames utilized in building construction industry. For example, the slideable rule carries notation spaced therealong indicating 12, 16, 24 inch centers. Consequently when the instructions require a series of equally spaced marks, the slidable rule can be moved or adjusted relative to a starting reference position such that the pointer can be registered with successive selected indicia and the plate marked at each such registration.

The table carries a pair of clamps which are spaced adjustable distances from the fence whereby varied widths of lumber can be measured and marked utilizing the table hereof. Likewise, the articulated linkage connecting the marker blade and carriage permits lumber of various depths to be marked. Furthermore, the measuring and marking apparatus hereof is formed of inexpensive construction material, primarily rectangular tube stock and sheet metal whereby it affords an inexpensive accurate albeit manually operated substitute for the more complex equipment for measuring and marking as disclosed in copending application Ser. No. 25,536.

Accordingly, it is a primary object of the present invention to provide a novel and improved measuring and marking apparatus for wooden structural elements.

It is another object of the present invention to provide a novel and improved measuring and marking apparatus for marking upper and lower plates of wooden structural frames at measured locations therealong to indicate the location of the intermediate frame parts, i.e., studs, jacks and the like.

It is still another object of the present invention to provide a novel and improved measuring and marking apparatus for wooden structural elements and the like which is simple and inexpensive to construct, readily and easily operated, and accurate in locating the marks along the wooden elements.

It is a further object of the present invention to provide a novel and improved measuring and marking apparatus for marking the upper and lower plates of wooden framing elements at locations indicative of the locations of the intermediate parts thereof and including a slidable rule for expeditious and convenient location of the centers for a plurality of like successively spaced intermediate frame parts along the plates.

These and further objects and advantages of the present invention will become more apparent upon reference to the following specification, appended claims and drawings wherein;

Figure 1:
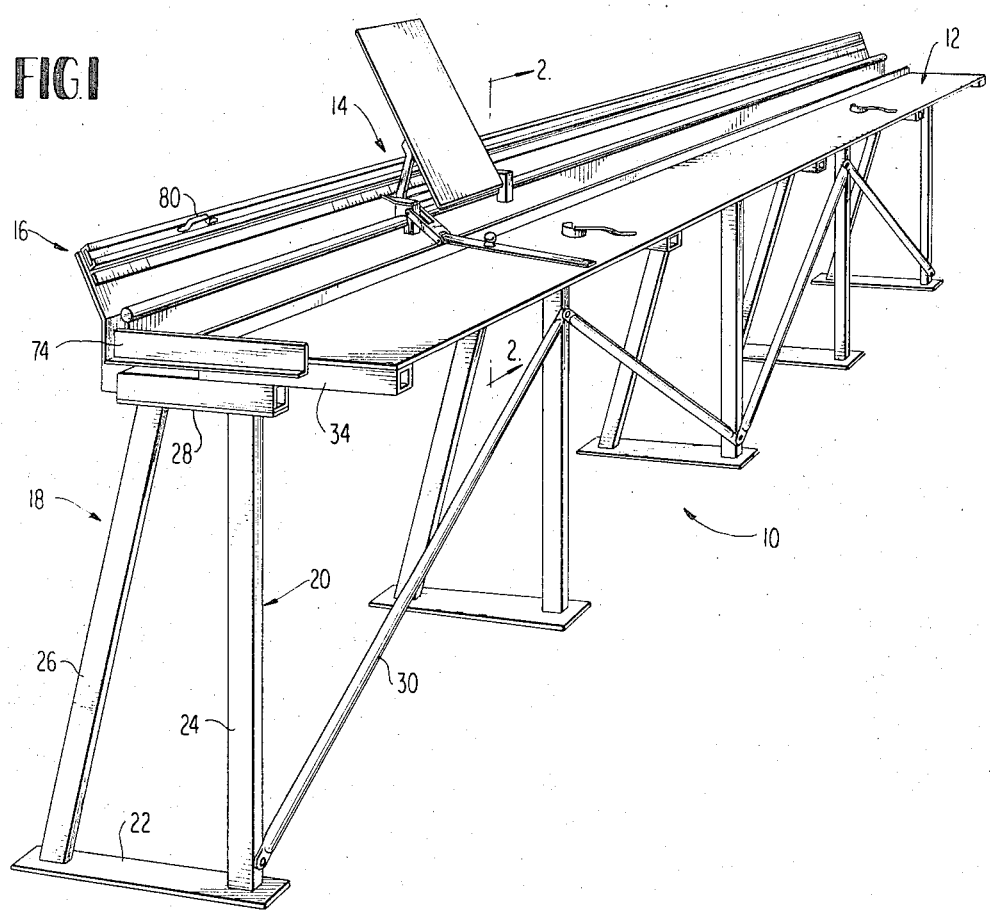
FIG. 1 is a perspective view of a marking table constructed in accordance with the present invention.

Referring now to the drawings, particularly to FIG. 1, there is illustrated a measuring and marking apparatus constructed in accordance with the present invention generally indicated 10 and comprised generally of a table 12, a carriage 14 mounted for slidable movement along the full length of table 12, a table back 16 for mounting indicia bearing rules hereof, and a frame 18 for supporting the foregoing structure. Particularly, the frame 18 includes a plurality of longitudinally spaced table supports generally indicated 20 each comprised of a bottom plate 22, front and back braces 24 and 26, respectively, and an upper plate 28. The back brace 26 is inclined forwardly to front brace 24 from bottom plate 22 to upper plate 28. The braces 24 and 26 are formed preferably of metal rectangular tubing. A plurality of diagonally extending cross bracing members 30 are provided between the supports 20 for added structural strength.

On the top of each support 20 is a short length of rectangular tubing 32 for supporting the table 12, carriage 14 and table back 16. Particularly, mounted on each tubing 32 is an additional table supporting tubing 34. Tubing 34 is preferably welded to tubing 32 and projects forwardly along the front side of supports 20. Table 12 may be comprised of sheet metal, suitably reinforced on its underside, or wood as desired, and overlies and is suitably secured to the outwardly projecting tubings 34. Also secured to tubings 32 and extending the full length of table 12 is a right angle member 36. One leg of member 36 butts the rearward ends of tubings 34 and projects upwardly beyond tubings 34 and the top of table 12 to provide an abutment or fence along the rear of the table against which the wooden members to be marked are butted. Fence 36 also structurally interconnects supports 20 along their upper edges.

Figure 5:
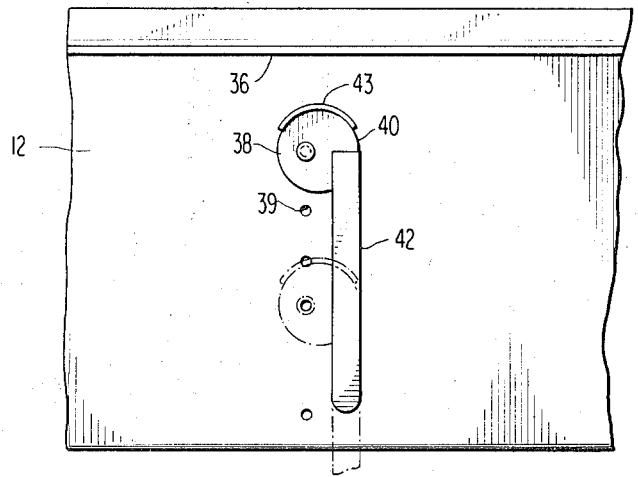
FIG. 5 is a fragmentary plan view of the table illustrating one of the clamps for maintaining the lumber in marking position.

Referring to FIG. 5, a pair of eccentric cams 38 are mounted at longitudinally spaced positions along table 12. Each cam comprises a disc 40 mounted for rotation about a point spaced from the center of the disc whereby, upon rotation of the cam by means of a lever 42, the distance between the cam edge 43 and the fence 36 can be varied to clamp the wooden member between the cam and fence 36. Pivotal mounting openings 39 for eccentric cam 38 are provided at a plurality of positions spaced from fence 36 whereby the clamps can be adjustably spaced from fence 36 to accommodate various widths of lumber.

Referring back to FIG. 2, another elongated right angle member 44 overlies and is secured to tubings 32 behind fence 36. Member 44 likewise extends the full length of table 10. The upstanding leg of angle 44 terminates in an enlargement 46 which provides a guide or rod along which carriage 14 may slide for the full length of the table. Angle member 44 is also secured to tubings 32 and thereby structurally interconnects the supports 20.

Figure 2:
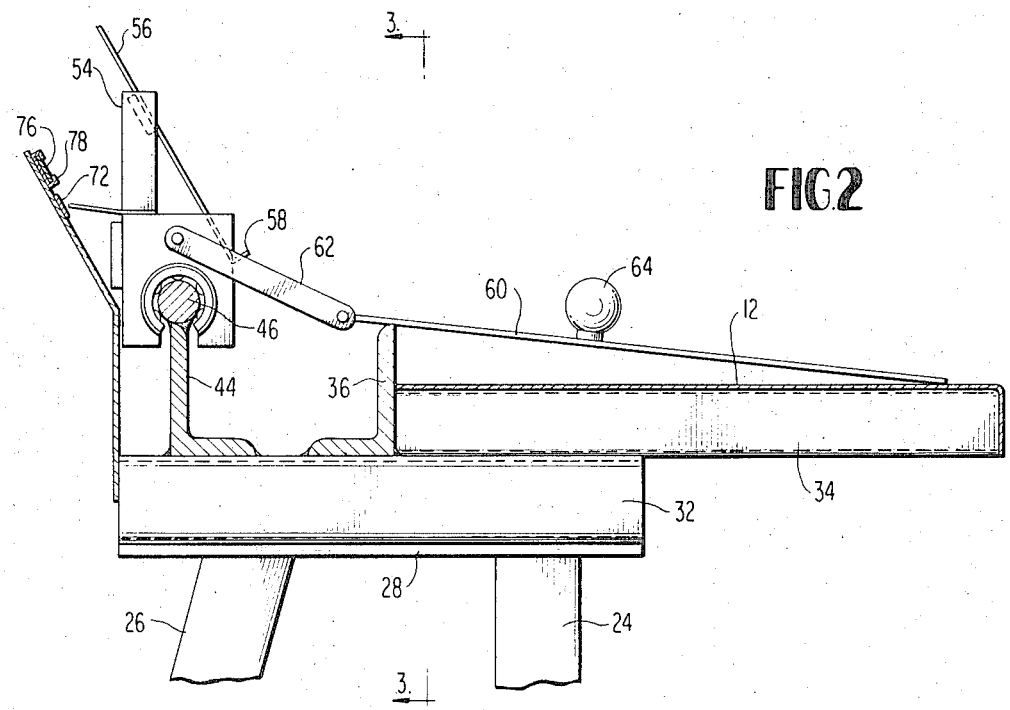
FIG. 2 is a fragmentary enlarged cross sectional view thereof taken about on line 2-2 in FIG. 1.
Figure 3:
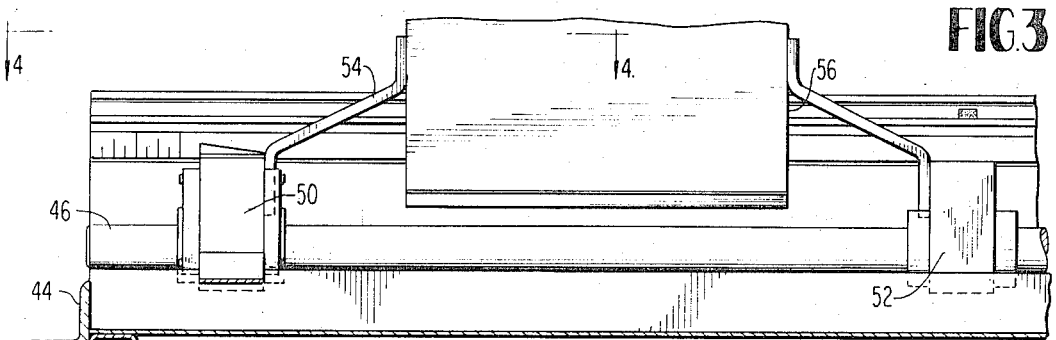
FIG. 3 is an enlarged fragmentary cross sectional view thereof taken generally about on line 3-3 in FIG. 2.
Figure 4:
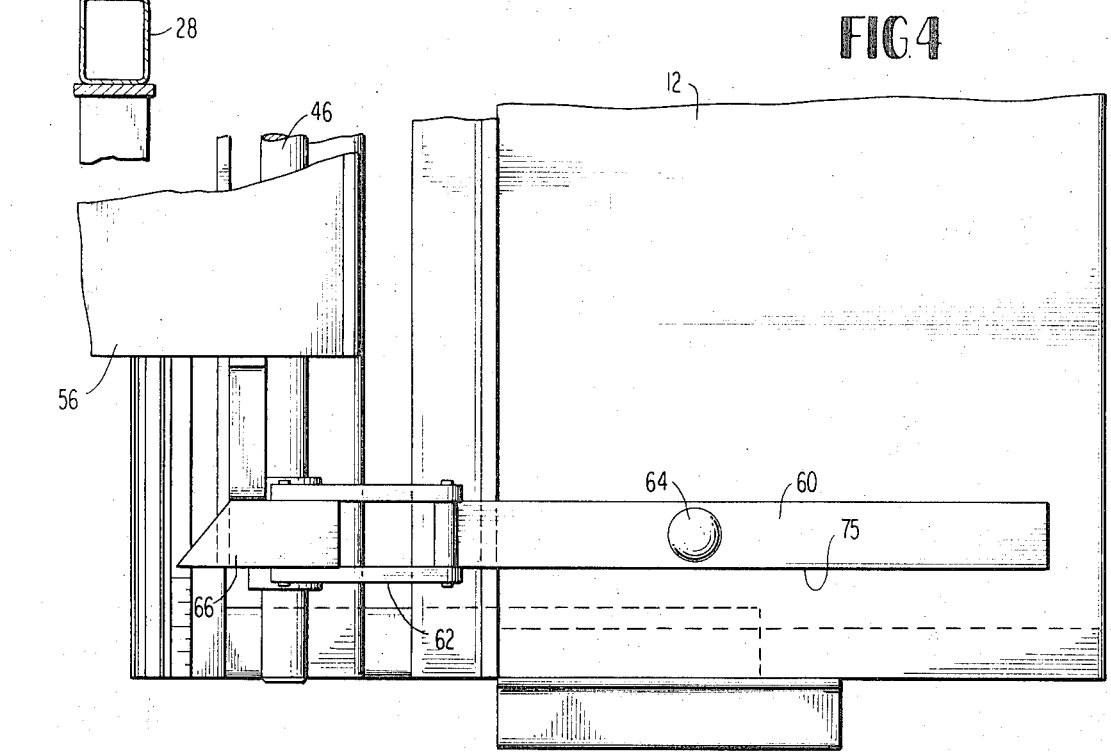
FIG. 4 is a fragmentary cross sectional view of the table and taken generally about on line 4-4 in FIG. 3.

Carriage 14 is slidably mounted on angle 44. Particularly, and referring to FIG. 3, carriage 14 comprises a pair of slides 50 and 52 each having a downwardly opening aperture for receiving the enlargement or rod 46 of angle 44. The slides 50 and 52 carry ball bearings along the inner surfaces of their apertures for sliding movement along the rod 46. Each slide 50 and 52 carries a generally Z-shaped bracket 54, the upper ends of which mount a clip board indicated 56. As indicated in FIG. 2, the clip board 56 is inclined and has a lower lip 58 whereby instructional material containing information for locating the marks along the lumber pieces on the table can be mounted for sliding movement with carriage 14.

A marking blade 60 is mounted on carriage 14 for movement therewith and overlies the table top 12. Blade 60 is carried by slide 50 through an articulated linkage including a pair of arms 62 pivoted on opposite sides to slide 50 and pivotally mounting between their opposite ends the inner end of blade 60. Blade 60 also mounts a knob 64 whereby it can be moved toward and away from table 12. The articulated linkage also permits the blade to lie flat along a wooden element disposed on table 12 irrespective of its width within a predetermined range of widths. The slide 50 also carries a rearwardly projecting pointer 66 for registration with the rules carried by table back 16.

Table back 16 includes an elongated member suitably secured to the rear end of tubings 32 and having a rearwardly and upwardly inclined portion 70. An elongated rule 72 is fixed to the inclined portion 70 at an elevation such that pointer 66 registers therewith. The rule extends the entire length of table 12 and preferably the zero position of the indicia carried thereby coincides at a like longitudinal position as an end stop 74 which is mounted at one end of table 12. Accordingly, the distance from a reference position or end stop 74 at any point along the table can be accurately determined by aligning the pointer 66 with the fixed rule 72. The blade 60 has an edge 75 in transverse alignment with pointer 66 whereby the distance measured along the rule is the same as the distance between blade edge 75 and end stop 74. Spaced above fixed rule 72 and mounted on inclined portion 70 is a sliding rule 76. Particularly, the sliding rule 76 comprises a metal tape confined within a pair of guides 78 for longitudinal sliding movement. Rule 76 carries a handle 80 (FIG. 1) whereby it can slide lengthwise along guides 76 to selected longitudinal positions as desired. Slideable rule 76 carries indicia spaced therealong corresponding to the spacing conventionally employed between the intermediate frame parts of a structural frame. For example, rule 76 carries indicia spaced one from the other 12 inches apart. Each set of indicia starts from a like reference position adjacent the end of the table at end stop 74. To avoid confusion in reading the indicia, the various sets may be color coded.

To utilize the measuring and marking apparatus hereof, a plate to be marked is disposed on table 12 with one end butted against end stop 74 and clamped against fence 36 by the eccentric clamps 38. The instructions carried by the clip board provide information relating to the distance between the end of the plate and the various locations of the intermediate frame parts along the plates. For example, the plate may be utilized in a frame which has studs successively spaced on 16 inch centers and such information is contained on the instruction sheet. The carriage 14 is then moved by a workman simply by grasping the knob 64 and sliding the carriage along slide rod 46, to successive positions spaced 16 inches apart by aligning the pointer with the rule 72 at 16 inch intervals. At each such alignment, the workman simply scribes a line along the face of the plate using the blade edge 75 as a guide. Alternatively, the 16 inch indicia on the sliding rule 76 can be utilized. This is accomplished by sliding rule 76 to a location where its zero position or any one of its 16 inch notations coincides with the zero position of rule 72 or any multiple of 16 inches on rule 72. Subsequently, the carriage can be stepped along slide rod 46 in successive 16 inch intervals with the pointer registering with the successive 16 inch notation. The workman, of course, marks the plate each time the pointer is aligned with the appropriate indicia. The foregoing described marking is accomplished using 12 and 24 inch centers in a similar manner or any other discrete spacing as desired.

In the event that a frame is interrupted by a door or a window which requires intermediate frame parts located at distances other than on standard centers, the instruction sheet will so indicate. Consequently the various locations of the intermediate frame parts for forming the door, window, or the like, are located as distances from the reference position and can be measured utilizing rule 72. When the door or window or the like appears early in the frame, and the remaining parts of the frame are on like centers, the slideable rule 76 can be utilized to effect the subsequent marking. Particularly, rule 76 is displaced such that one of its indicia notation, i.e., 12, 16, 24 inch or other notation as the case may be, is aligned with the last marking. Thereafter, subsequent markings on like centers can be located on the plates as previously described with respect to rule 76. Thus, the slideable rule provides a convenient indicia for use in marking plates utilized in frames having one or more doors, windows, or the like where a large number of intermediate parts located on like centers are utilized.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Measuring and marking apparatus for lumber pieces and the like comprising:

a support structure, an elongated table carried by said support structure, an abutment carried by said table, the table and abutment being adapted to receive a lumber piece thereagainst thereby fixing the location of the lumber piece relative to said apparatus, a guide carried by said support structure substantially coextensively with said table, a carriage carried by said guide for movement therealong, means carried by said support structure and defining a length reference position, measuring means carried by said support structure substantially coextensively with said table for measuring distances along the lumber piece from said reference position, said measuring means including a pair of rules each carrying discrete indicia, one of saie rules being fixed to said support structure and the other of said rules being slidably carried by said support structure for movement therealong in a direction parallel to the long axis of said table, means carried by the slidable rule for sliding the same along said support structure, said reference position means including and end stop carried by said table for abutment with the end of the lumber piece and for use with said one rule, said reference position means further including a selected one of the indicia carried by said slidable rule, an arm pivotally carried by said carriage and projecting transversely therefrom to overlie said table and the lumber piece carried thereby for locating a mark on the lumber piece, a pointer carried by said carriage and registrable with a selected one of said measuring indicia on one of said rules thereby locating said arm at a predetermined length along the lumber piece from said reference position, said carriage mounting a stand for carrying measuring and marking instructions, said stand being movable with said carriage.

2. Apparatus according to claim 1, including means carried by said support structure for clamping the lumber piece against said abutment and said end stop.

3. Apparatus according to claim 1, wherein said arm is carried by said carriage for pivotal movement about two discrete generally parallel axes wherein said arm is maintainable in a generally horizontal disposition at a plurality of various elevations above said table.

* * * * *

UNITED STATES PATENT OFFICE
CERTIFICATE OF CORRECTION

Patent No. 3,822,475  Dated July 9, 1974

Inventor(s) JOHN CALVIN JUREIT

It is certified that error appears in the above-identified patent and that said Letters Patent are hereby corrected as shown below:

Col. 1, line 46, "in a small" should read --in small--.

Col. 2, line 6, "a registry" should read --such registry--.

Col. 3, line 62, "supporting" should read --support--.

Col. 6, line 34, claim 1, "saie" should read --said--.

Col. 6, line 40, claim 1, "and end" should read --an end--.

Signed and sealed this 29th day of October 1974.

(SEAL)
Attest:

McCOY M. GIBSON JR.
Attesting Officer

C. MARSHALL DANN
Commissioner of Patents